United States Patent
Yang et al.

(10) Patent No.: US 10,942,759 B2
(45) Date of Patent: Mar. 9, 2021

(54) SEAMLESS VIRTUAL STANDARD SWITCH TO VIRTUAL DISTRIBUTED SWITCH MIGRATION FOR HYPER-CONVERGED INFRASTRUCTURE

(71) Applicant: VMware, Inc., Palo Alto, CA (US)

(72) Inventors: Yang Yang, Shanghai (CN); Jin Feng, Shanghai (CN); Chengmao Lu, Shanghai (CN)

(73) Assignee: VMWARE, INC., Palo Alto, CA (US)

( * ) Notice: Subject to any disclaimer, the term of this patent is extended or adjusted under 35 U.S.C. 154(b) by 308 days.

(21) Appl. No.: 16/013,960

(22) Filed: Jun. 21, 2018

(65) Prior Publication Data

US 2019/0391831 A1    Dec. 26, 2019

(51) Int. Cl.
  *G06F 9/455* (2018.01)
  *G06F 9/54* (2006.01)
  *H04L 29/08* (2006.01)

(52) U.S. Cl.
  CPC .......... *G06F 9/45558* (2013.01); *G06F 9/547* (2013.01); *H04L 67/10* (2013.01); *G06F 2009/4557* (2013.01); *G06F 2009/45595* (2013.01)

(58) Field of Classification Search
  CPC .......... G06F 9/45558; G06F 9/547; G06F 2009/4557; G06F 2009/45595; H04L 67/10
  See application file for complete search history.

(56) References Cited

U.S. PATENT DOCUMENTS

| | | | |
|---|---|---|---|
| 9,432,254 B1* | 8/2016 | Naqvi | H04L 41/084 |
| 2013/0308492 A1* | 11/2013 | Baphna | H04L 41/0803 370/254 |
| 2016/0196158 A1* | 7/2016 | Nipane | G06F 9/45558 718/1 |
| 2016/0291999 A1* | 10/2016 | Antony | G06F 16/178 |

OTHER PUBLICATIONS

Everitt, Brian; "Cisco HyperFlex Systems: Converting to Distributed Virtual Switches for Cisco HyperFlex VM Guest and VMotion Networks", CISCO White Paper, Aug. 2016. (Year: 2016).*
VMware, "VMware vNetwork Distributed Switch: Migration and Configuration" White Paper, 2009 (Year: 2009).*

* cited by examiner

*Primary Examiner* — Wissam Rashid
(74) *Attorney, Agent, or Firm* — SU IP Consulting

(57) ABSTRACT

A method to migrate a cluster's hosts and virtual machines from virtual standard switches to a virtual distributed switch includes creating distributed port groups on the virtual distributed switch, where properties of the distributed port groups are automatically replicated to host proxy switches on the hosts. The method further includes configuring the distributed port group with ephemeral binding so port binding of the distributed port group is configurable through a host in the cluster even when an infrastructure virtual machine that manages the cluster is down, determining (or receiving user input indicating) the infrastructure virtual machine is on the host, and issuing a call to the host to migrate (1) the infrastructure virtual machine to the distributed port group and (2) one or more physical network interface cards of the host to the virtual distributed switch.

20 Claims, 6 Drawing Sheets

SEAMLESS VIRTUAL STANDARD SWITCH TO VIRTUAL DISTRIBUTED SWITCH MIGRATION FOR HYPER-CONVERGED INFRASTRUCTURE

BACKGROUND

Through virtualization, virtual machines with different operating systems may run on the same physical machine. Each virtual machine (VM) is provisioned with virtual resources that provide similar functions as the physical hardware of a physical machine, such as central processing unit (CPU), memory, and network resources, to run an operating system and applications.

VMware vSphere is a suite of virtualization software for implementing and managing virtual infrastructures. The software includes (1) ESXi hypervisor that implements VMs on physical hosts, (2) virtual storage area network (vSAN) that pools and shares local storage across a cluster of ESXi hosts, (3) vCenter Server that centrally provisions and manages vSphere objects such as virtual datacenters, VMs, ESXi hosts, clusters, datastores, and virtual networks, and (4) vSphere Web Client (server) that allows web browser access to the vCenter Server. The vSAN software may be implemented as part of the ESXi hypervisor software.

A typical vSphere virtual infrastructure consists of basic physical building blocks such as x86 host computers, storage networks and arrays, IP networks, a management server, and desktop clients.

Host computers—Industry standard x86 server computers run the ESXi hypervisor on the bare metal. Similarly configured x86 server computers with connections to the same network and storage subsystems can be grouped to create a cluster with an aggregate set of resources in the virtual environment, which enables vSphere High Availability (HA), vSphere Distributed Resource Scheduler (DRS), and the VMware vSAN features.

Storage networks and arrays—Fibre Channel storage area network (SAN) arrays, iSCSI SAN arrays, and network-attached storage (NAS) arrays are widely used storage technologies supported by VMware vSphere to meet different data center storage needs. The storage arrays are connected to and shared between groups of host computers through storage area networks. This arrangement allows aggregation of the storage resources and provides more flexibility in provisioning them to virtual machines.

IP networks—Each host computer can have multiple physical network adapters to provide high bandwidth and reliable networking to the entire VMware vSphere data center.

Management server—vCenter Server provides centralized control of the data center. It provides essential data center services such as access control, performance monitoring, and configuration. It unifies the resources from the individual host computers to be shared among virtual machines in the entire data center. It manages the assignment of virtual machines to the host computers and the assignment of resources to the virtual machines within a given host computer. These assignments are based on the policies that the system administrator sets.

Management clients—VMware vSphere provides several interfaces for data center management and virtual machine access. These interfaces include vSphere Web Client for access through a web browser, vSphere Command-Line Interface (vSphere CLI), or customized interface based on vSphere software development kit (SDK).

The vSAN software uses the concept of a disk group as a container for solid-state drives (SSDs) and non-SSDs, such as hard disk drives (HDDs). On each node that contributes storage to a vSAN cluster, the node's local drives are organized into one or more disk groups. Each disk group includes one SSD that serves as read cache and write buffer, and one or more non-SSDs that serve as permanent storage. The aggregate of the disk groups from all the nodes form a vSAN datastore distributed and shared across the nodes.

vSAN introduces a converged storage-compute platform where VMs are running on ESXi hosts as usual while a small percentage of CPU and memory resources is used to serve the storage needs of the same VMs. vSAN enables administrators to specify storage attributes, such as capacity, performance, and availability, in the form of simple policies on a per-VM basis.

Using the vSphere Web Client or a command line interface (CLI), an administrator accesses the vCenter Server to configure and manage vSAN clusters. To create a vSAN cluster, the administrator creates a new cluster, enables vSAN for the cluster, adds hosts to the cluster, adds drives on the clustered hosts (nodes) to a vSAN datastore, and creates a vSAN network that connects the nodes over a physical network (e.g., creates a virtual standard switch with a VMkernel port enabled with vSAN traffic on each node). Instead of creating a new host cluster, the administrator can also enable vSAN on an existing host cluster. The administrator creates a VM storage policy that defines storage requirements, such as capacity, performance, and availability supported by the vSAN datastore, for a VM and its virtual disks. When the administrator deploys the VM storage policy on a VM, the vSAN software places the VM in the vSAN datastore based on the storage requirement of the policy.

BRIEF DESCRIPTION OF THE DRAWINGS

FIG. 3-1 is a block diagram illustrating virtual networking with virtual standard switches in the virtual infrastructure of FIG. 1 in some examples of the present disclosures.

FIG. 3-2 is a block diagram illustrating virtual networking in the virtual infrastructure of FIG. 1 after migrating hosts and virtual machines from the virtual standard switches to a virtual distributed switch in examples of the present disclosures.

DETAILED DESCRIPTION

Figure 1:
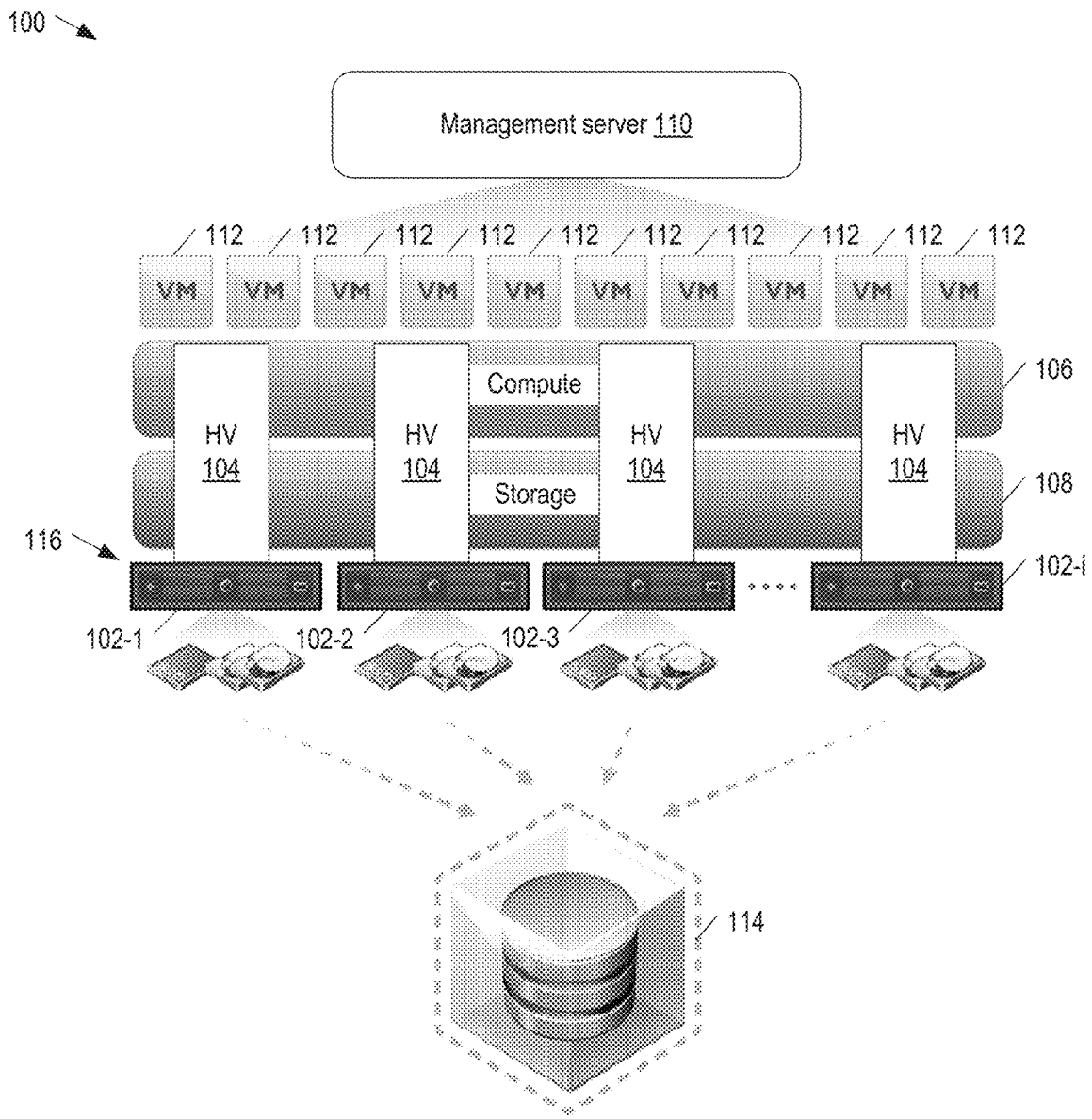
FIG. 1 is a block diagram illustrating a simplified view of a virtual infrastructure, such as a virtual datacenter, with software-defined shared storage in examples of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

In a vSAN cluster, a customer may wish to migrate virtual machine and host networks attached to virtual standard switches to a virtual distributed switch. The configuration of a typical vSAN cluster may be as follows.

1.1 Three or more hosts each uses a virtual standard switch with multiple virtual networks (port groups), such as (1) a host management network connecting management VMkernel adapters (also called virtual adapters or "vmknics"), (2) virtual machine (VM) networks connecting all the VMs to a physical network, and (3) a vSAN network connecting vSAN vmknics.

1.2 On each host, the virtual standard switch is backed by one or more physical network interface cards (each also known as "pnic") that bridge the physical network.

Migrating from the virtual standard switches to the virtual distributed switch may accomplish the following.

2.1 Any infrastructure VM located on a host in the vSAN cluster and the host's physical network interface cards should migrate atomically at the same time. An infrastructure VM may be any virtual machine that affects infrastructure management. A typical infrastructure VM is a management server (e.g., a vSphere vCenter Server) of the vSAN cluster or a database for the management server. The placement of infrastructure VMs in the vSAN cluster creates a causality dilemma (chicken or the egg problem) for the migration as the management server typically calls the migration application programming interface (API) on the host and it cannot do that when it or its database is being migrated in the same process.

2.2 The migration must tolerate loss of network connectivity. The VMs are made up of storage objects duplicated on multiple hosts. During migration, a storage object becomes inaccessible when its host loses network connectivity. For data consistency, the hosts mark the corresponding VM as inaccessible. Modification to the VM's virtual networking may fail as the hosts would reject changes to the VM's configuration files (e.g., vmx files).

In some examples of the present disclosure, a primary network migrator is part of an infrastructure VM (e.g., a management server) of a hyper-converged cluster. For example, the primary network migrator is a service running inside of a management server (e.g., vCenter Server) and the management server is an infrastructure VM when it is deployed in the host (more specifically the host's hypervisor) whose network is to be migrated. The primary network migrator generates a migration plan for migrating the cluster's hosts and virtual machines from virtual standard switches to a virtual distributed switch. The primary network migrator devises the migration plan based on port groups in the virtual standard switches and physical network interface cards bound to the virtual standard switches. Based on the migration plan, the primary network migrator configures the virtual distributed switch with a similar setup as the virtual standard switches. The primary network migrator enables one of the distributed port groups with ephemeral binding so that the distributed port group is configurable through the hosts. The primary network migrator may automatically identify any infrastructure VM located on a host in the hyper-converged cluster by browsing network addresses of all the VMs in the hyper-converged cluster and comparing them against a network address of the infrastructure VM.

To address an infrastructure VM's loss of network connectivity during migration, a secondary network migrator is added to the hosts (more specifically to their hypervisors) to atomically migrate the infrastructure VM and physical network interface cards of its host to the virtual distributed switch. In some examples of the present disclosure, the primary network migrator calls the secondary network migrator on each host to perform the following:

3.1 When the infrastructure VM is on its host, the secondary network migrator migrates the infrastructure VM to the distributed port group with ephemeral binding that is host configurable. This allows the migration to continue even when the infrastructure VM and the primary network migrator are inaccessible.

3.2 The secondary network migrator migrates physical network interface cards of its host to the uplink group of the virtual distributed switch.

3.4 The secondary network migrator prepares rollback in case any of the above steps fails. In case of a migration failure, the rollback reverts the network setups of the infrastructure VM and the host to prevent permanent network loss to the vSAN cluster. The secondary network migrator may use a timeout mechanism to determine when it should rollback the infrastructure VM and the host network setups.

The vSAN software on the hosts implements a heartbeat mechanism to monitor network connectivity between the hosts. The vSAN software on the hosts also exchanges updates to a cluster directory of disks, disk groups, and storage objects in the vSAN cluster. For example, a host assigned as the master node in the vSAN cluster exchanges heartbeats and cluster updates with the other hosts in the cluster. The vSAN software on the hosts marks storage objects as inaccessible when they reside on a host that loses network connectivity. For example, the master node detects several missing heartbeats from a host and marks the storage objects residing on that host as inaccessible in the cluster directory.

On each host, a distributed object manager (DOM) component of the vSAN software detects the inaccessible storage objects in the cluster directory and notifies a vSAN management daemon of the vSAN software on the host about the inaccessible storage objects. The vSAN management daemon determines VMs corresponding to the inaccessible storage objects from the cluster directory and notifies a management daemon (hostd) of the hypervisor on the host to mark these VMs as inaccessible.

During the migration of the infrastructure VM and its host, there may be a brief period of network partition that makes other VMs inaccessible as described above. In some examples of the present disclosure, the primary network migrator performs the following to tolerate the transient network partition:

4.1. The primary network migrator uses the property collector service of the management server (e.g., vCenter server) to collect the status of all the VMs in the hyper-converged cluster. If any non-infrastructure VM on a host is inaccessible, the primary network migrator waits for the VM to be accessible since the VM cannot be updated when its storage object is inaccessible.

4.2. Once all the non-infrastructure VMs on the host are accessible, the primary network migrator migrates them to their distributed port groups on the virtual distributed switch based on the migration plan.

The primary network migrator processes one host at a time. As the physical network adapters of the hosts are always present, a smooth network migration is expected for all the hosts.

FIG. 1 is a block diagram illustrating a simplified view of a virtual infrastructure 100 (e.g., a virtual datacenter) with software-defined shared storage in examples of the present disclosure. Virtual infrastructure 100 includes hosts 102-1, 102-2, 102-3, . . . 102-i (collectively "hosts 102" or individually as a generic "host 102") running hypervisors 104 to provide a compute virtualization layer 106 and a storage virtualization layer 108. A management server 110 centrally provisions and manages (1) VMs 112 on compute virtualization layer 106 and (2) a hyper-converged datastore 114 on storage virtualization layer 108. Hosts 102 make up nodes of a hyper-converged cluster 116. Nodes 102 contribute local storage resources (e.g., SSDs and non-SSDs) that form hyper-converged datastore 114. Nodes 102 share hyper-converged datastore 114 to store VMs 112 as storage objects with object components distributed across the nodes. Virtual infrastructure 100 may be a vSphere data center, hypervisor 104 may be vSphere ESXi hypervisor embedded with vSAN, management server 110 may be vCenter Server, hyper-converged datastore 114 may be a vSAN datastore, and hyper-converged cluster 116 may be a vSAN cluster. For convenience, host 102 and its hypervisor 104 are used interchangeably.

Figure 2:
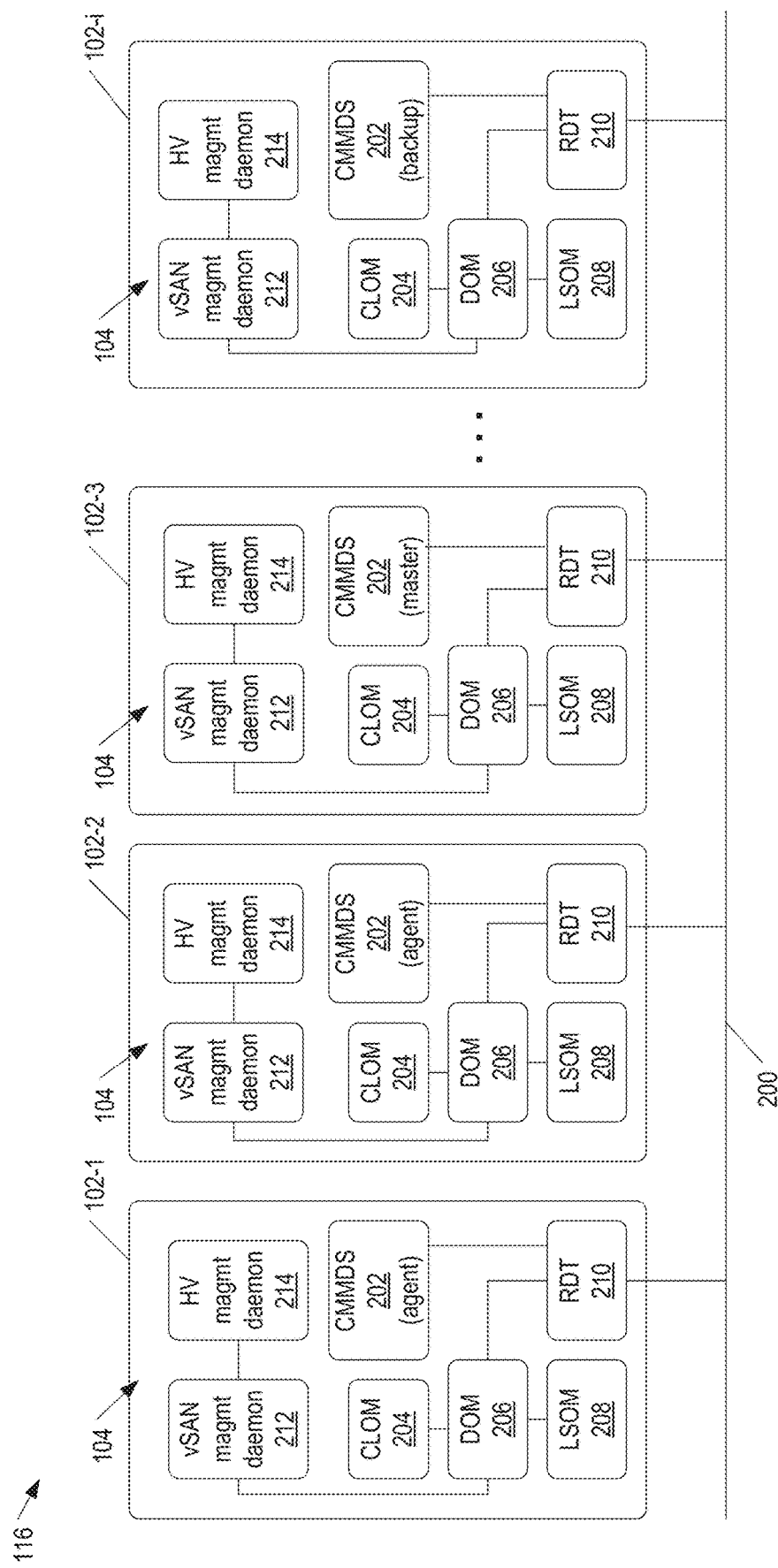
FIG. 2 is a block diagram illustrating storage virtualization software in the virtual infrastructure of FIG. 1 in some examples of the present disclosure.

FIG. 2 is a block diagram illustrating storage virtualization software of hypervisors 104 on nodes 102 in some examples of the present disclosure. The storage virtualization software may be vSAN software.

Each node 102 includes a cluster monitoring, membership and directory services (CMMDS) module 202 that discovers, establishes, and maintains hyper-converged cluster 116. CMMDS module 202 on each host is responsible for monitoring the status of other nodes in the vSAN cluster through a message bus, such as checking heartbeats between nodes and publishing updates to a cluster directory. Other software components use the cluster directory to learn of changes in cluster topology and object configuration. For example, DOM module 206 uses the contents of the cluster directory to determine the nodes storing the components of an object and the paths by which those nodes are reachable.

Each node 102 further includes other modules to read and write objects saved in clustered datastore 114, such as a cluster level object manager (CLOM) module 204, a DOM module 206, a local log structured object management (LSOM) module 208, and a reliable datagram transport (RDT) module 210.

Figures 1, 3:
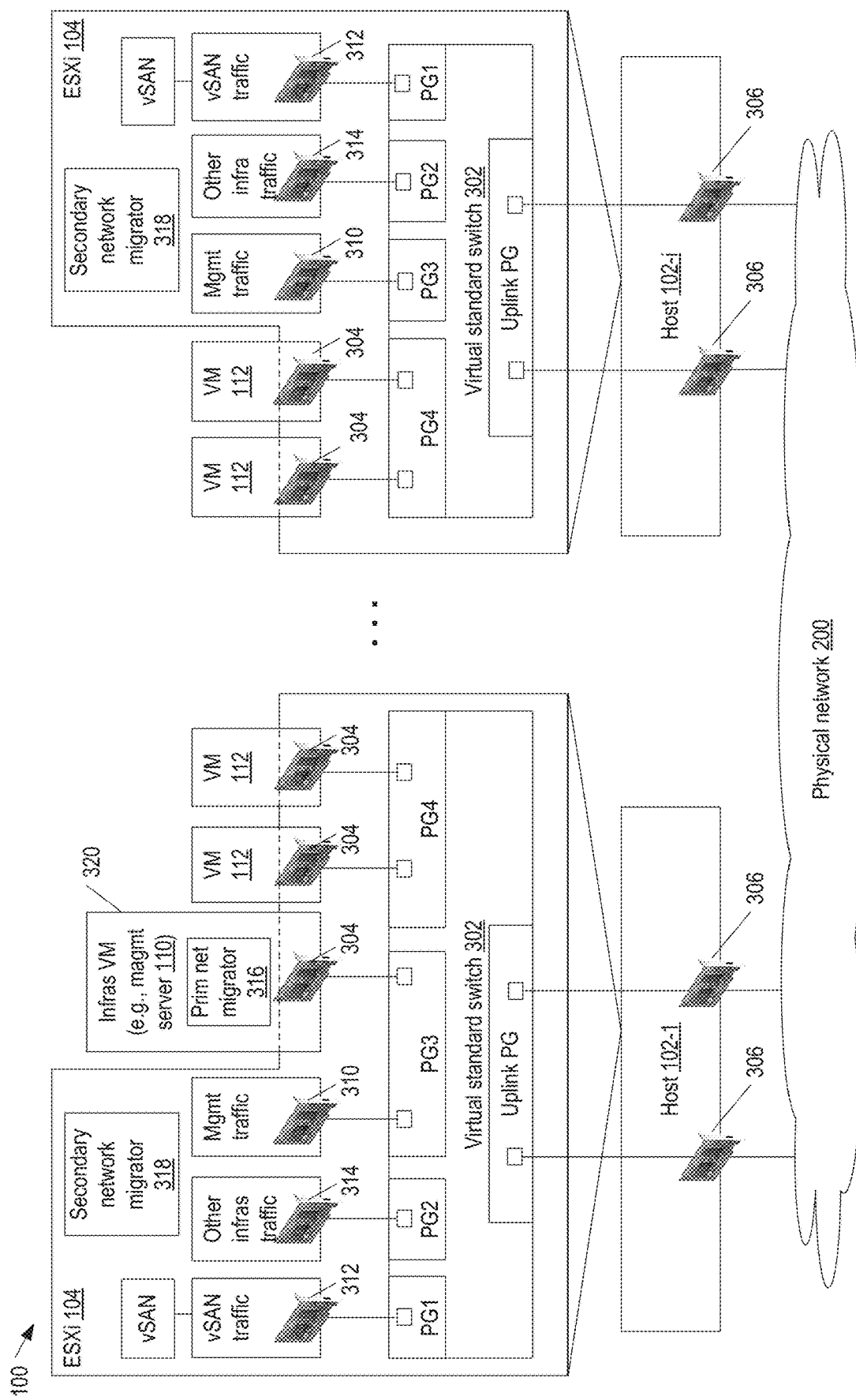
Figures 2, 3:
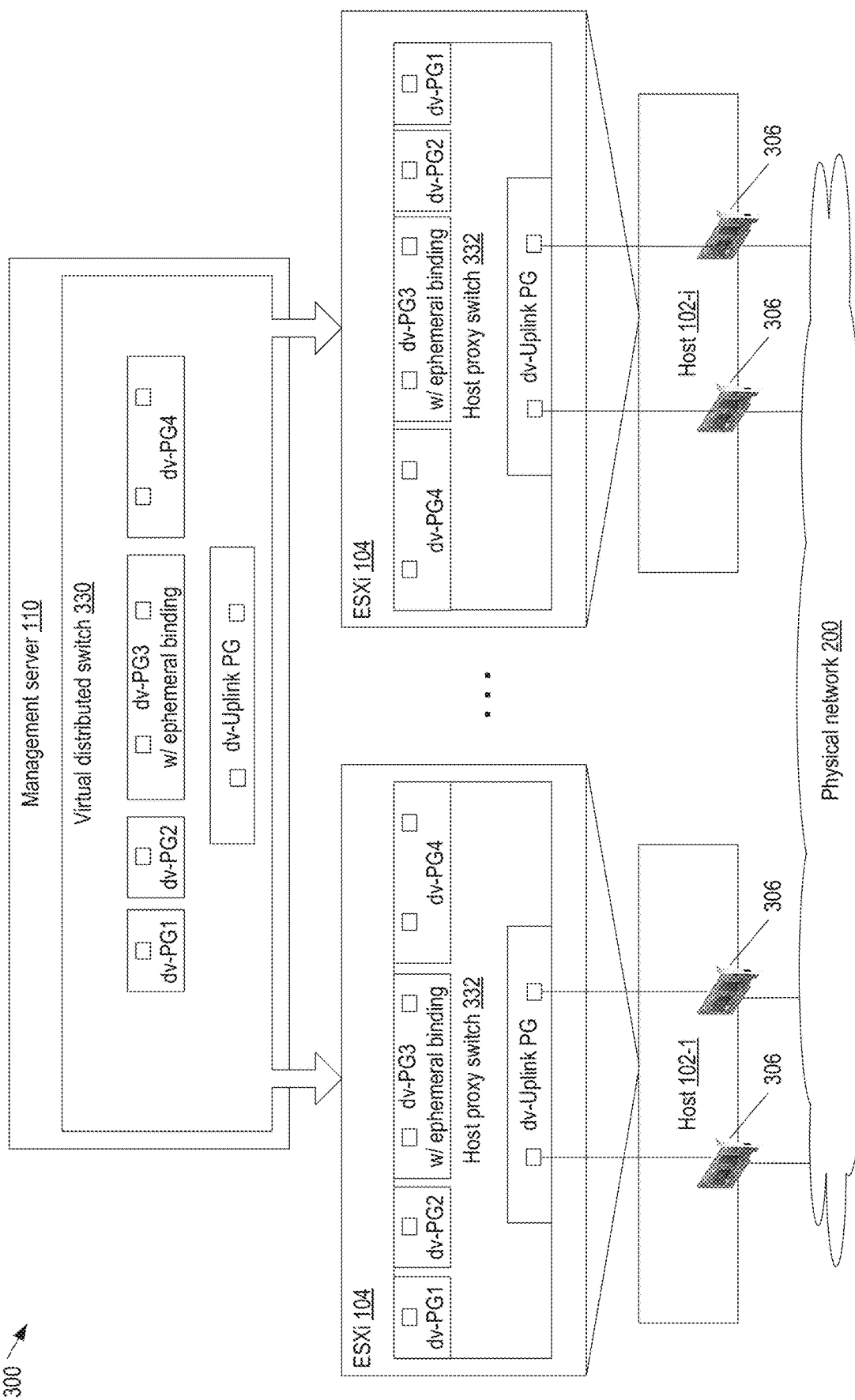

FIG. 3-1 is a block diagram illustrating virtual networking in virtual infrastructure 100 in some examples of the present disclosures. Virtual infrastructure 100 may include virtual standard switches 302 (e.g., each a vSphere Virtual Standard Switch or "VSS"). VMs 112 have virtual network interface cards (vNICs) 304 connected to ports on virtual standard switch 302. Each port on a virtual standard switch 302 is a member of a single port group, which provides connectivity and common network configuration for VMs. For example, a port group 4 (PG4) connects VMs 112 on two hosts 102. A VMkernel adapter on a virtual standard switch 302 provides network connectivity for hosts and to handle the system traffic. For example, a VMkernel adapter 310 connected to a port group 3 (PG3) on a virtual standard switch 302 handles host management traffic and a VMkernel adapter 312 connected to a port group 1 (PG1) on a standard virtual switch 302 handles virtual storage traffic (e.g., vSAN traffic). Additional VMkernel adapters 314 may be added to a standard virtual switch 302 to handle other infrastructure traffic, such as live VM migration (e.g., vMotion) traffic, network storage (e.g., iSCSI) traffic, or fault tolerance (FT) traffic. Physical network interface cards (pnic) 306 on a host 102 are connected to uplink ports of a virtual standard switch 302 to provide connectivity to an external physical network 200. For demonstrative purposes, an infrastructure VM 320 is located on hypervisor 104 of host 102-1. Infrastructure VM 320 has a vNIC 304 connected to port group 3 (PG3). For example, infrastructure VM 320 is management server 110 (e.g., vCenter Server) implemented as a virtual machine or appliance.

Virtual infrastructure 100 includes a network migrator to migrate VMs and host networks from virtual standard switches 302 to a virtual distributed switch 330 (FIG. 3-2) in hyper-converged cluster 116. The network migrator may be implemented as a primary network migrator 316 and a secondary network migrator 318. Primary network migrator 316 may be part of management server 110 while secondary network migrator 318 may be independent of management server 110. Secondary network migrator may be part of management daemon 214 of hypervisors 104 on all the hosts 102. Primary network migrator 316 may operate when management server 110 has network connectivity and handoff the migration to secondary network migrator 318 when management server 110 loses network connectivity. Primary network migrator 316 and secondary network migrator 318 communicate through the management network between management server 110 and hypervisors 104 on all the hosts 102, and such communication may be hypertext transfer protocol (HTTP) requests.

FIG. 3-2 is a block diagram illustrating virtual networking in virtual infrastructure 100 after migrating hosts 102 and VMs 112 from virtual standard switches 302 (FIG. 3-1) to a virtual distributed switch 330 (e.g., a vSphere Virtual Distributed Switch or "VDS") in some examples of the present disclosures. Virtual distributed switch 330 is set up on management server 110, and its settings are propagated to host proxy switches 332 on hosts 102 bound to virtual distributed switch. This allows the virtual networking to be administered on a data center level. Virtual distributed switch 330 has distributed port groups to provide network connectivity to VMs 112 and accommodate VMkernel traffic. Virtual distributed switch 330 also has an uplink port group to provide connectivity to physical network 200. The properties of virtual distributed switch 330 mirror those of virtual standard switches 302.

Figure 4:
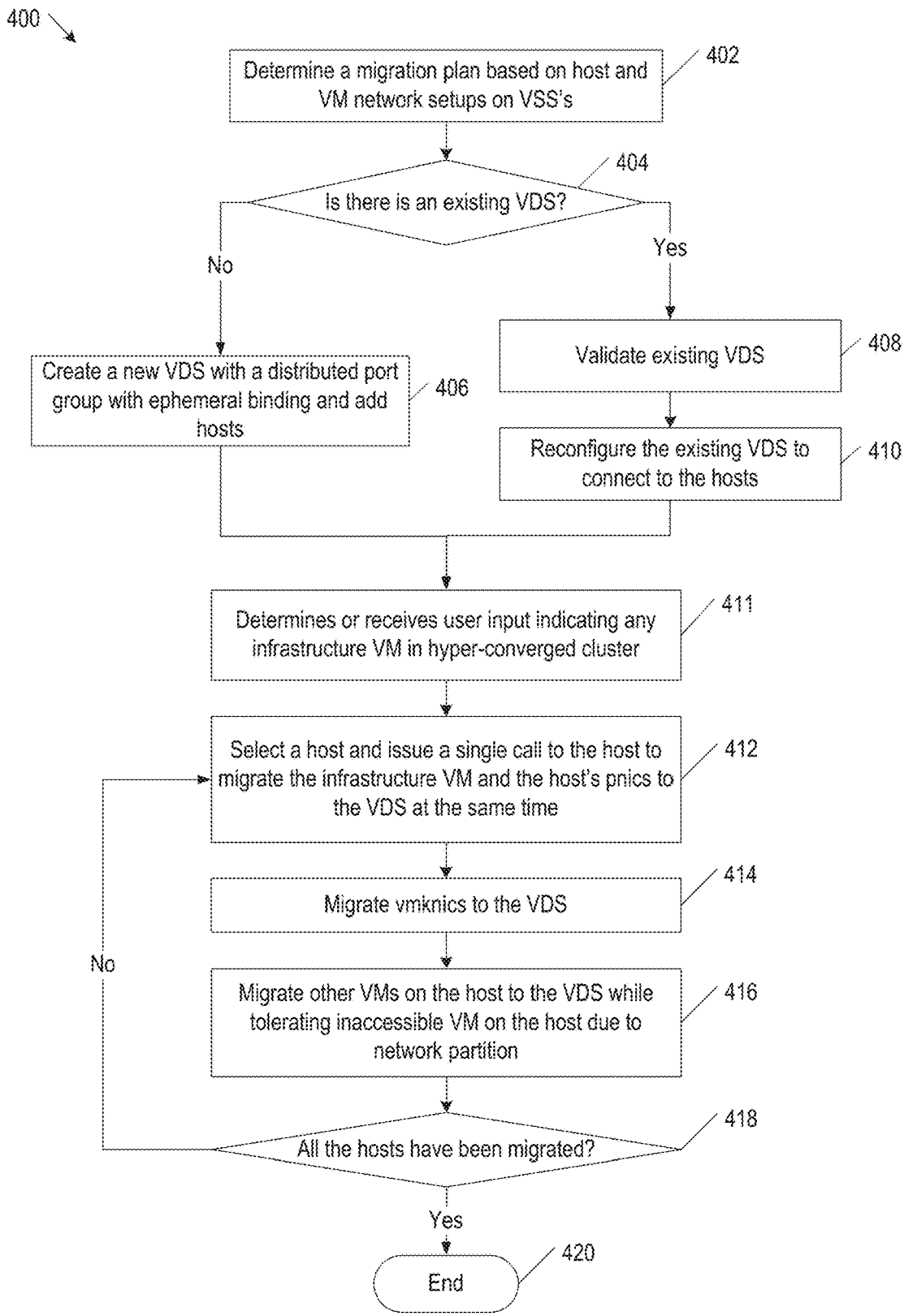
FIG. 4 is a block diagram illustrating a flowchart of a method to migrate hosts and virtual machines from virtual standard switches to a virtual distributed switch in some examples of the present disclosure.

FIG. 4 is a block diagram illustrating a flowchart of a method 400 to migrate from virtual standard switches 302 (FIG. 3-1) to virtual distributed switch 330 (FIG. 3-2) in some examples of the present disclosure. Method 400, and any method described herein, may be implemented as instructions encoded on a computer-readable medium that is to be executed by a processor in a computer system. Method 400, and any method described herein, may include one or more operations, functions, or actions illustrated by one or more blocks. Although the blocks are illustrated in sequential orders, these blocks may also be performed in parallel, and/or in a different order than those described herein. In addition, the various blocks may be combined into fewer blocks, divided into additional blocks, and/or eliminated based upon the desired implementation. Method 400 may begin in block 402.

In block 402, the network migrator determines a migration plan based on network setups of hosts 102 and the VMs 112 (FIG. 3-1) on virtual standard switches 302. Primary network migrator 316 (FIG. 3-1) may devise distributed port groups on virtual distributed switch 330 based on port groups on virtual standard switches 302. Primary network migrator 316 may name the distributed port groups based on the port groups. For example, primary network migrator 316 plans distributed port groups dv-PG1 to dv-PG4 on virtual distributed switch 330 that correspond to port groups PG1 to PG4 on virtual standard switches 302.

Primary network migrator 316 may devise mappings of VMs 112 to the distributed port groups on each host 102 based on mappings of the VMs to the port groups on the host. For example, on host 102-1, primary network migrator 316 plans to map management server 110 to distributed port group dv-PG3 and VMs 112 to distributed port group dv-PG4.

Primary network migrator 316 may devise teaming policies of the distributed port groups to physical network interface cards of each host 102 based on teaming policies of the ports groups to the physical network adapters on the host. A teaming policy may be a load balancing or failover policy. For example, on host 102-1, primary network migrator 316 plans a load balancing policy of distributed port group dv-PG3 to physical network interface cards 306 on the host based on the load balancing policy for port group PG3 to physical network interface cards 306 on the host.

Primary network migrator 316 may automatically determine if any infrastructure VM (e.g., management server 110) is on a host 102 in hyper-converged cluster 116. For example, primary network migrator 316 queries management server 110 for its network address and network addresses of all the VMs 102 in hyper-converged cluster 116. Primary network migrator 316 compares the network address of management server 110 against the network addresses of all the VMs 102 in hyper-converged cluster 116. If there is a match, primary network migrator 316 determines an infrastructure VM (e.g., management server 110) is on a host 102 in hyper-converged cluster 116. As an alternative to or in addition to the steps above, primary network migrator 316 may receive user input identifying management server 110 or another infrastructure VM (e.g., a database server of management server 110) that is on a host 102 in hyper-converged cluster 116.

Primary network migrator 316 records the above information in the migration plan. Block 402 may be followed by block 404.

In block 404, the network migrator determines if there is an existing virtual distributed switch in hyper-converged cluster 116. For example, primary network migrator 316 may query an inventory of hyper-converged cluster 116 maintained by management server 110 to determine if there is an existing virtual distributed switch. If so, block 404 may be followed by block 406. Otherwise block 404 may be followed by block 408.

In block 406, the network migrator creates a new virtual distributed switch 330 based on the migration plan devised in block 402. For example, primary network migrator 316 creates virtual distributed switch 330 with (1) an uplink port group having the same number of uplinks as virtual standard switches 302 and (2) distributed port groups dv-PG1 to dv-PG4. For example, primary network migrator 316 enables ephemeral binding on distributed port group dv-PG3 designated for management traffic. Primary network migrator 316 also adds (connects) hosts 102 to virtual distributed switch 330. Block 406 may be followed by block 412.

In block 408, the network migrator validates an existing virtual distributed switch 330 for use in migration. For example, primary network migrator 316 determines if virtual distributed switch 330 has a sufficient number of uplinks in its uplink port group and a compatible software version. Block 408 may be followed by block 410.

In block 410, the network migrator reconfigures virtual distributed switch 330 based on the migration plan devised in block 402. For example, primary network migrator 316 creates distributed port groups dv-PG1 to dv-PG4, enables ephemeral binding on distributed port group dv-PG3 designated for management traffic, and adds (connects) hosts 102 to virtual distributed switch 330. Block 410 may be followed by block 412.

In block 412, the network migrator selects one of hosts 102 to migrate to virtual distributed switch 330. For example, primary network migrator randomly selects a host 102 and passes the migration plan determined in block 402 to secondary network migrator 318 on the selected host to migrate the selected host to virtual distributed switch 330. When the migration plan indicates the selected host 102 includes an infrastructure VM (e.g., management server 110), secondary network migrator 318 on the selected host issues a single call to the selected host to migrate the infrastructure VM and the selected host's physical network interface cards 306 to virtual distributed switch 330 at the same time. If not, secondary network migrator 318 issues a call to migrate the selected host's physical network interface cards 306 to virtual distributed switch 330. Block 412 may be followed by block 414.

Figure 5:
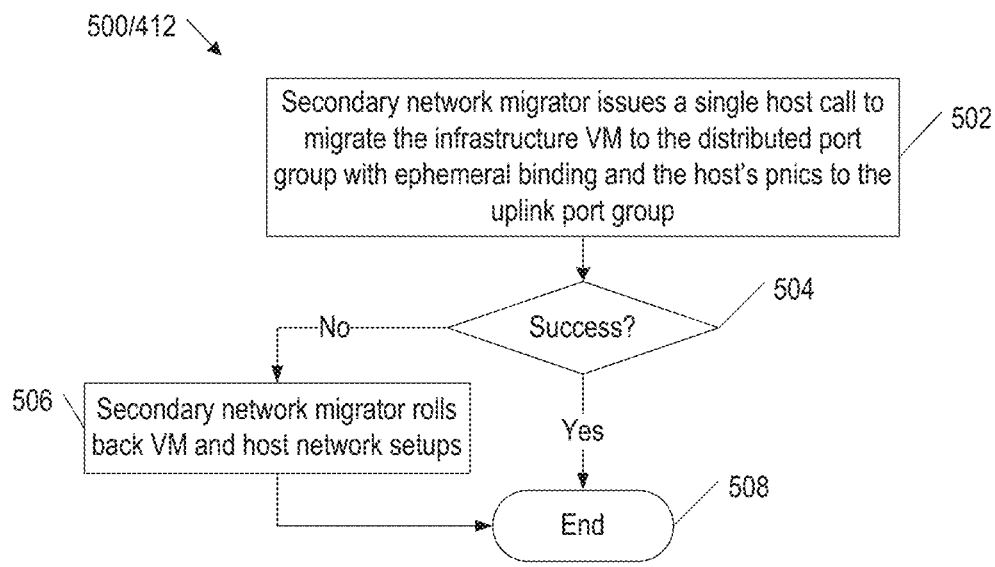
FIG. 5 is a block diagram illustrating a flowchart of a method implementing one part of the method in FIG. 4 in some examples of the present disclosure.

FIG. 5 is a block diagram illustrating a flowchart of a method 500 implementing block 412 in some examples of the present disclosure. Method 500 may begin in block 502.

In block 502, when an infrastructure VM (e.g., management server 110) in on its host, secondary network migrator 318 issues a single call to the selected host 102 to (1) migrate the infrastructure VM to distributed port group dv-PG3 with ephemeral binding on virtual distributed switch 330, and (2) migrate the selected host's physical network interface cards 306 to the uplink port group on virtual distributed switch 330. Migrating the infrastructure VM to distributed port group dv-PG3 means binding a virtual network interface card 304 of the infrastructure VM to distributed port group dv-PG3, which is possible because distributed port group dv-PG3 is host configurable through ephemeral binding. Once the infrastructure VM (e.g., management server 110) is migrated to distributed port group dv-PG3 and the selected host's physical network interface cards 306 are migrated to the uplink port group on virtual distributed switch 330, the infrastructure VM would be able to communicate with and manage the other hosts (more specifically their hypervisors) over the selected host's physical network interface cards. When an infrastructure VM is not on the selected host 102, secondary network migrator issues a call to the selected host to migrate the selected host's physical network interface cards to the uplink port group on virtual distributed switch 330. Block 502 may be followed by block 504.

In block 504, secondary network migrator 318 determines if the migration in block 502 is successful. When the migration completes before a timeout period, secondary network migrator 318 deems the migration a success and block 504 may be followed by block 508 that ends method 500. Otherwise block 504 may be followed by block 506.

In block 506, secondary network migrator 318 rolls back the network setups of the host and the infrastructure VM back to prior the migration in block 502. Block 506 may be followed by block 508 that ends method 500.

Referring to FIG. 4, in block 414, the network migrator migrates VMkernel adapters on the selected host 102 to virtual distributed switch 330 based on the migration plan devised in block 402. Primary network migrator 316 matches up the VMkernel adapters on virtual standard switch 302 of the selected host 102 to the distributed port groups on virtual distributed switch 330. For example, on host 102-1, primary network migrator 316 binds VMkernel adapter 310 for management traffic to distributed port group dv-PG3, VMkernel adapter 312 for vSAN traffic to distributed port group dv-PG1, and VMkernel adapter 314 for other infrastructure traffic to distributed port group dv-PG2. Block 414 may be followed by block 416.

In block 416, the network migrator migrates the other VMs on the selected host 102 to virtual distributed switch 330 based on the migration plan devised in block 402 while tolerating any inaccessible VM on the selected host due to network partition. Primary network migrator 316 migrates the remaining VMs on the selected host 102 to the distribute port group on virtual distributed switch 330 based on the migration plan. Block 416 may be followed by block 418.

Figure 6:
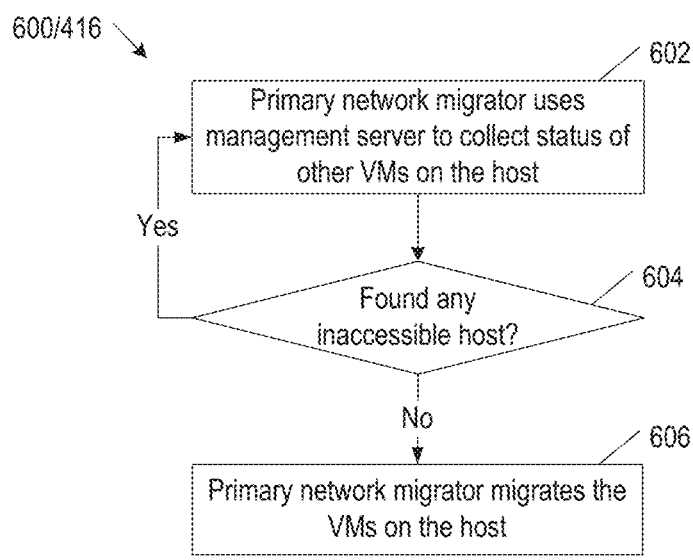
FIG. 6 is a block diagram illustrating a flowchart of a method implementing another part of the method in FIG. 4 in some examples of the present disclosure.

FIG. 6 is a block diagram illustrating a flowchart of a method 600 implementing block 416 in some examples of the present disclosure. Method 600 may begin in block 602.

In block 602, primary network migrator 316 uses management server 110 to collect VM status on the selected host 102. Block 602 may be followed by block 604.

In block 604, primary network migrator 316 determines if any of the remaining VMs on the host is inaccessible. If so, primary network migrator 316 waits for the inaccessible VM to recover and block 604 loops back to block 602. Otherwise block 604 may be followed by block 606. As described above, DOM module 206 (FIG. 2) on the host detects inaccessible storage objects in the cluster directory and notifies vSAN management daemon 212 (FIG. 2) on the host about the inaccessible storage objects. vSAN management daemon 212 determines VMs corresponding to the inaccessible storage objects from the cluster directory and notifies hypervisor management daemon 214 on the host to mark these VMs as inaccessible.

In block 606, primary network migrator 316 migrates the remaining VMs on the selected host 102 to the distributed port groups on virtual distributed switch 330. For example, on host 102-1, primary network migrator 316 binds vNICs 304 of VMs 112 to distributed port group dv-PG4.

Referring to FIG. 4, in block 418, the network migrator determines if all the hosts 102 have been migrated to virtual distributed switch 330. For example, primary network migrator 316 determines if it has processed all the hosts 102. If not, block 418 may loop back to block 412 where the network migrator processes another host 102. Otherwise block 418 may be followed by block 420 that ends method 400.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A method for a network migrator to migrate hosts and virtual machines of a cluster from virtual switches on the hosts in the cluster to a virtual distributed switch, the method comprising:
   determining a migration plan based on network setups of the hosts and the virtual machines by:
      devising distributed port groups on the virtual distributed switch that correspond to port groups on the virtual switches; and
      devising mappings of the virtual machines to the distributed port groups based on mappings of the virtual machines to the port groups on the virtual switches;
   creating the virtual distributed switch with the distributed port groups based on the migration plan, or when the virtual distributed switch already exists, validating the virtual distributed switch and configuring the virtual distributed switch with the distributed port groups based on the migration plan,
   wherein properties of the distributed port groups are automatically replicated to host proxy switches on the hosts;
   enabling port binding, of a distributed port group amongst the distributed port groups, to be host configurable;
   determining, or receiving user input indicating, that an infrastructure virtual machine that manages the cluster is on a host in the cluster; and
   issuing a call to the host to: (1) migrate the infrastructure virtual machine to the distributed port group, and (2) migrate one or more physical network interface cards of the host to the virtual distributed switch.

2. The method of claim 1, wherein validating the virtual distributed switch comprises determining that the virtual distributed switch has a sufficient number of uplinks or a compatible software version.

3. The method of claim 1, wherein determining that the infrastructure virtual machine is on the host in the cluster comprises determining that the infrastructure virtual machine and one of the virtual machines in the cluster have a same network address.

4. The method of claim 1, further comprising devising the call to the host based on the migration plan, wherein the call to the host specifies bindings of:
   the infrastructure virtual machine to the distributed port group of the virtual distributed switch; and
   the one or more physical network interface cards of the host to an uplink port group of the virtual distributed switch, thereby removing the one or more physical network interface cards of the host from a virtual switch on the host.

5. The method of claim 4, wherein:
   determining the migration plan further comprises determining teaming policies of the distributed port groups to physical network interface cards of the hosts based on teaming policies of the port groups on the virtual switches to the physical network interface cards; and
   the call to the host further specifies a load balancing or failover policy for the one or more physical network cards of the host in the distributed port group of the virtual distributed switch.

6. The method of claim 4, further comprising after issuing the call to the host and when a migration of the host and the infrastructure virtual machine fails, rolling back network setups of the infrastructure virtual machine and the host.

7. The method of claim 1, further comprising migrating other virtual machines on the host from a virtual switch on the host to the virtual distributed switch.

8. The method of claim 7, wherein migrating the other virtual machines on the host comprises:
   determining accessibility of the other virtual machines on the host; and
   waiting for one or more inaccessible virtual machines from the other virtual machines on the host to recover and then binding the other virtual machines to the distributed port groups of the virtual distributed switch based on the migration plan.

9. The method of claim 8, wherein:
   the cluster comprises a virtual storage area network cluster in which each virtual machine comprises a storage object saved on multiple hosts, the hosts exchange heartbeats to indicate normal operation, and the hosts mark a virtual machine as inaccessible when any host with the storage object is inaccessible; and
   determining accessibility of the other virtual machines on the host comprises collecting virtual machine properties from the hosts and determining the one or more inaccessible virtual machines from the virtual machine properties.

10. A non-transitory computer-readable storage medium encoded with instructions executable by a processor to implement a method to migrate hosts and virtual machines of a cluster from virtual switches on the hosts in the cluster to a virtual distributed switch, wherein the method comprises:
   creating distributed port groups on the virtual distributed switch, wherein properties of the distributed port groups are automatically replicated to host proxy switches on the hosts;
   enabling port binding, of a distributed port group amongst the distributed port groups, to be host configurable;
   determining, or receiving user input indicating, that an infrastructure virtual machine that manages the cluster is on a host in the cluster, wherein determining that the infrastructure virtual machine is on the host in the cluster comprises determining that the infrastructure virtual machine and one of the virtual machines in the cluster have a same network address; and
   issuing a call to the host to: (1) migrate the infrastructure virtual machine to the distributed port group, and (2) migrate one or more physical network interface cards of the host to the virtual distributed switch.

11. The non-transitory computer-readable storage medium of claim 10, wherein the method further comprises:
   determining a migration plan based on network setups of the hosts and the virtual machines by:
      devising the distributed port groups on the virtual distributed switch that correspond to port groups on the virtual switches; and
      devising mappings of the virtual machines to the distributed port groups based on mappings of the virtual machines to the port groups on the virtual switches; and
   creating the virtual distributed switch with the distributed port groups based on the migration plan, or when the virtual distributed switch already exists, validating the virtual distributed switch and configuring the virtual distributed switch with the distributed port groups based on the migration plan.

12. The non-transitory computer-readable storage medium of claim 10, wherein the method further comprises devising the call to the host based on the migration plan, wherein the call to the host specifies bindings of:
   the infrastructure virtual machine to the distributed port group of the virtual distributed switch; and
   the one or more physical network interface cards of the host to an uplink port group of the virtual distributed switch, thereby removing the one or more physical network interface cards of the host from a virtual switch on the host.

13. A computer system, comprising:
   a cluster of hosts;
   a host in the cluster:
   a hypervisor on the host;
   an infrastructure virtual machine on the hypervisor, wherein the infrastructure virtual machine comprises a management server that manages the cluster;
   a virtual distributed switch having distributed port groups, wherein properties of the distributed port groups are automatically replicated to host proxy switches on the hosts in the cluster;
   virtual switches on the hosts;
   a primary network migrator in the infrastructure virtual machine, wherein the primary network migrator is configured to:
      determine a migration plan based on host and virtual machine network setups in the cluster by:
         devising the distributed port groups for the virtual distributed switch that correspond to port groups on the virtual switches on the hosts in the cluster;
         devising mappings of virtual machines on the hosts in the cluster to the distributed port groups based on mappings of the virtual machines to the port groups on the virtual switches on the hosts; and
         determining teaming policies of the distributed port groups to physical network interface cards of the hosts based on teaming policies of the port groups on the virtual switches to the physical network interface cards;
      create the distributed port groups on the virtual distributed switch;
      enable port binding, of a distributed port group amongst the distributed port groups, to be host configurable; and
      determine, or receive user input indicating, that the infrastructure virtual machine is on the host; and
   a secondary network migrator on the hypervisor, wherein the secondary network migrator is configured to:
      issue a call to the host to: (1) migrate the infrastructure virtual machine to the distributed port group, and (2) migrate one or more physical network interface cards of the host to the virtual distributed switch.

14. The computer system of claim 13, wherein the primary network migrator is further configured to create the virtual distributed switch with the distributed port groups based on the migration plan, or when the virtual distributed switch already exists, validate the virtual distributed switch and configure the virtual distributed switch with the distributed port groups based on the migration plan.

15. The computer system of claim 13, wherein the primary network migrator is further configured to devise the call to the host based on the migration plan, and wherein the call to the host specifies:
   first bindings of the infrastructure virtual machine to the distributed port group of the virtual distributed switch;
   second bindings of the one or more physical network interface cards of the host to an uplink port group of the virtual distributed switch, thereby removing the one or more physical network interface cards of the host from a virtual switch on the host; and a load balancing or failover policy for the one or more physical network cards of the host in the distributed port group of the virtual distributed switch.

16. The computer system of claim 15, wherein the secondary network migrator is further configured to, after issuing the call to the host and when a migration of the host and the infrastructure virtual machine fails, roll back network setups of the infrastructure virtual machine and the host.

17. The computer system of claim 13, wherein the primary network migrator is further configured to migrate other virtual machines on the host from a virtual switch on the host to the virtual distributed switch.

18. The computer system of claim 17, wherein to migrate the other virtual machines on the host, the primary network migrator is configured to:
   determine accessibility of the other virtual machines on the host; and
   wait for one or more inaccessible virtual machines from the other virtual machines on the host to recover and then bind the other virtual machines to the distributed port groups of the virtual distributed switch based on the migration plan.

19. The computer system of claim 18, wherein:
   the cluster comprises a virtual storage area network cluster in which each virtual machine comprises a storage object saved on multiple hosts, the hosts exchange heartbeats to indicate normal operation, and the hosts mark a virtual machine as inaccessible when any host with the storage object is inaccessible; and
   to determine accessibility of the other virtual machines on the host the primary network migrator is configured to collect virtual machine properties from the hosts and determine the one or more inaccessible virtual machines from the virtual machine properties.

20. The computer system of claim 13, wherein to determine that the infrastructure virtual machine is on the host in the cluster, the primary network migrator is configured to determine that the infrastructure virtual machine and one of the virtual machines in the cluster have a same network address.

* * * * *